March 12, 1963 H. K. ORBACH ETAL 3,081,156
SEPARATION OF DEUTERIUM FROM HYDROGEN
Filed April 8, 1960
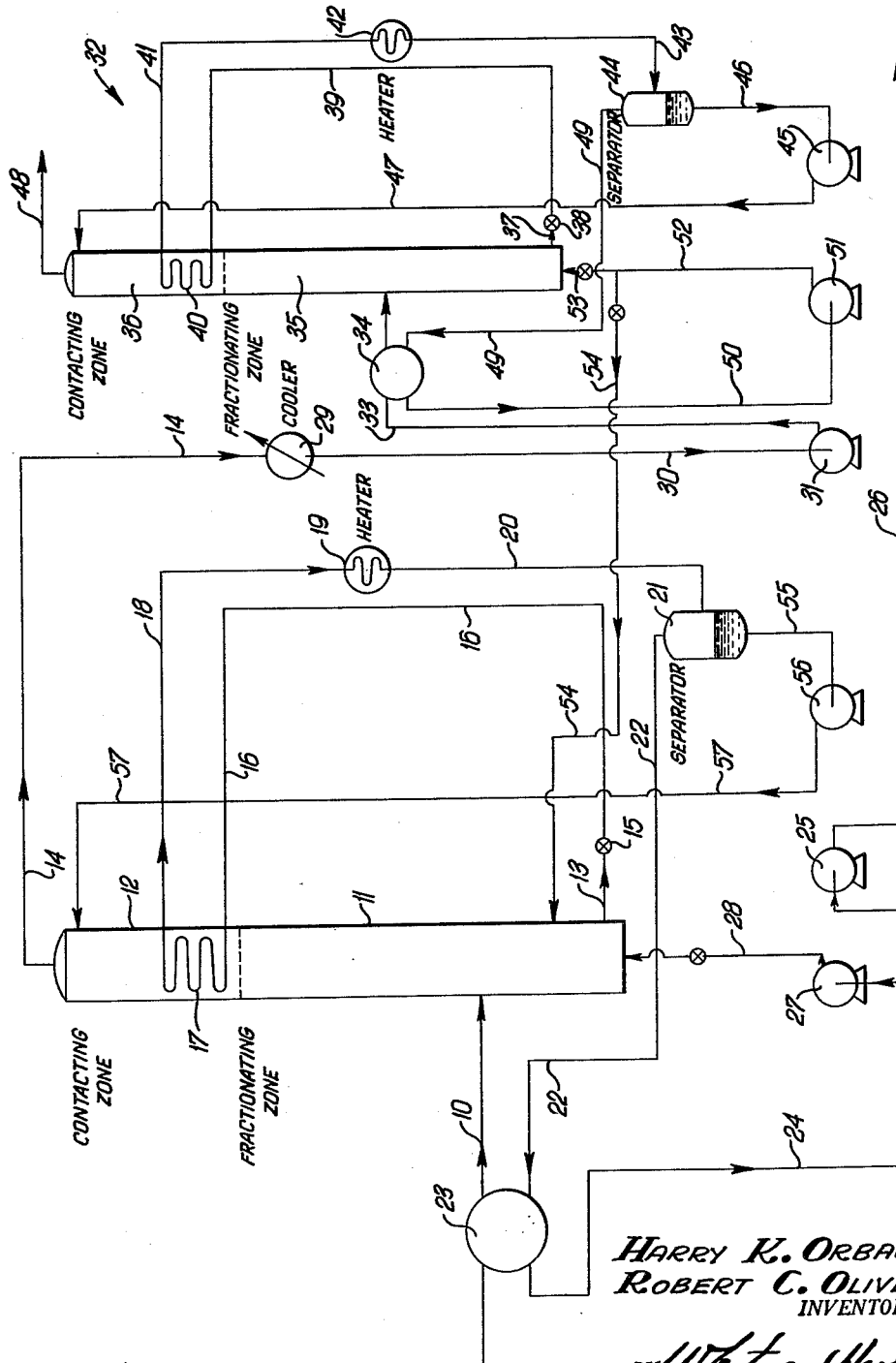
Harry K. Orbach
Robert C. Oliver
INVENTORS.
BY *White and Haefliger*
ATTORNEYS.

Patented Mar. 12, 1963

3,081,156
SEPARATION OF DEUTERIUM FROM HYDROGEN
Harry K. Orbach and Robert C. Oliver, Whittier, Calif.,
assignors to The Fluor Corporation, Ltd., Los Angeles,
Calif., a corporation of California
Filed Apr. 8, 1960, Ser. No. 20,899
15 Claims. (Cl. 23—210)

This invention has to do generally with the separation of the isotopes of hydrogen from mixtures thereof, and is directed particularly to an improved process for the recovery of deuterium or deuterium-rich gas, from a mixture of the isotopes of hydrogen, i.e. protium, hereinafter called "hydrogen," and deuterium. A major use for the process is for the fractionation of gas consisting essentially of hydrogen and about 0.005 to 0.10 mol percent deuterium.

The invention is predicated as to selectivity in fractionation, upon the different vapor pressure characteristics and relationships of the alkali metal hydrides and deuterides at the same temperature, and specifically upon the fact that throughout wide temperature ranges, the vapor pressure of deuterium over the alkali metal deuteride is sufficiently greater than the vapor pressure of hydrogen over the corresponding hydride, to render the relationship usable for effective separation of deuterium from the mixture.

Generally considered, the invention contemplated improved processes within the scope of the appended claims, in which a hydrogen-deuterium mixture from a fractionating zone is contacted with molten alkali metal to form a mixture of the hydride and deuteride which then is contacted in the fractionating zone with a feed gas mixture to effect an exchange of hydrogen with deuterium in the deuteride, which results in a deuterium-enriched gas going to the contacting zone, and concentration of the molten hydride removed from the fractionating zone. In this manner we obtain from the contacting zone a deuterium-enriched gaseous effluent which, where the feed to the fractionating zone is hydrogen with its usual low deuterium content, may be further treated and in essentially the same manner to derive product deuterium closely approaching purity, or exceeding 95 percent deuterium, depending upon the purity desired.

Particularly contemplated by the invention is a system rendered practicably economical by conservation of heat generated in the fractionation and contacting stages, for use in dissociating the molten hydride taken from the fractionating zone. In accordance with the invention the hydride is reduced in pressure to produce at least partial dissociation, and passed in heat exchange relation with the reactants in the contacting zone. The hydride preferably then is independently and further heated to a degree of substantially complete dissociation and the residual alkali metal passed to the contacting zone for reaction with the gaseous fractionating zone effluent.

As indicated, the deuterium-enriched effluent from the contacting zone may be processed in essentially the same manner as the described feed gas treatment to concentrate the deuterium to desired purity. An illustrative embodiment of such an entire system, together with various details in addition to the features mentioned, will be fully understood from the following description in which reference is had to the accompanying drawing in flow sheet form.

Preliminarily it may be observed that reference herein to deuterium content is inclusive of both HD and $D_2$, but is calculated and regarded as the equivalent in $D_2$ content. The terms "molten hydride" of "molten deuteride" are intended to include solutions or slurries of these compounds in molten alkali metal.

The feed stream introduced to the system through line 10, and which may be derived from any considerable source, typically consists essentially of hydrogen containing between about 0.005 to 0.10 mol percent deuterium. The feed enters a fractionating column or zone 11 wherein the gas passes upwardly in intimate contact with downflowing alkali metal hydride which, as formed in the contacting zone 12, contains a small percentage of the alkali metal deuteride. As will be understood, the fractionating zone may contain any suitable means such as known forms of packing or trays for effecting intimacy of contact between the gas and liquid phases. Because of the vapor pressure relationships which we have mentioned in the foregoing, hydrogen in the feed gas exchanges with deuterium in the alkali metal deuteride within the fractionating zone, with the result that the molten stream withdrawn from the base of the fractionating zone through line 13 will consist essentially of the alkali metal hydride.

The gaseous effluent from the fractionating zone enters the contacting zone 12 which, it will be understood, may be formed or accommodated by a chamber or zone in any suitable location or physical relationship to the fractionating column. Merely in contemplation of possible economy in incorporating both zones in a single column structure, the contacting zone is shown as a top section of the column, through which gas from the fractionating zone flows upwardly in contact with molten alkali metal to form the hydride together with a small percentage of the deuteride in keeping with the deuterium content of the feed. The deuterium-enriched residual gas passes from the contacting zone through line 14 for further treatment, as will later appear.

The fractionating zone is maintained under sufficient pressure to permit dissociation of the hydride at least partially, and preferably to a major degree, by pressure reduction as at the valve 15. The resulting stream then passes through line 16 in indirect heat exchange with the gas and alkali metal undergoing exothermic reaction in the contacting zone 12, by passage through suitable exchanger means typified by the coil 17. The dissociated hydride stream then passes through line 18 to heater 19 wherein the stream is further heated to assure complete decomposition of any hydride. The heater effluent then is passed through line 20 to separator 21, from which the gas phase is withdrawn through line 22 for heat exchange with the feed in exchanger 23, the essentially hydrogen stream then being taken through line 24 by compressor 25 and discharged through line 26 to storage. A portion of the gas is returned by pump 27 through line 28 as stripping gas to the bottom of the fractionating zone 11.

The molten alkali metal separated in chamber 21 is taken through line 55 to be discharged by pump 56 through line 57 to the top of the contacting zone 12, within which the alkali metal flows downwardly in intimate reacting contact with the gaseous effluent from the fractionating zone, the exothermically generated heat being transferred to the stream in exchanger 17, and the reduced temperature alkali metal hydride then flowing down into the fractionating zone.

The deuterium-enriched overhead from the contacting zone may be further concentrated by passage of the gas in line 14 through cooler 29 and line 30 to be discharged by compressor 31 to a second plant stage, generally indicated at 32, essentially the same as the system as described up to this point. Accordingly, the second stage feed is discharged by pump 31 through line 33 and exchanger 34 into fractionating zone 35 for upward flow therein and in intimate contact with down-flowing molten alkali metal hydride and deuteride from the contacting zone 36. The essentially molten hydride stream withdrawn from the base of the fractionating zone through line 37 is pressure reduced at valve 38 and the resulting stream discharged through line 39, exchanger 40, line 41, heater 42 and line 43 to the separator 44. The molten alkali metal is taken by pump 45 from the separator through line 46 and is discharged through line 47 to the top of the contacting zone 36 for reaction therein with the countercurrently flowing gaseous effluent from the fractionating zone 35. The residual overhead gas consisting essentially of deuterium, or highly concentrated in deuterium, is taken to storage through line 48.

Gas consisting of hydrogen with perhaps a small amount of deuterium, flows from the separator 44 through line 49, exchanger 34 and line 50 to be discharged by compressor 51 through line 52 and then taken in part through line 53 as stripping gas into the bottom of fractionating zone 35, the remainder being recycled through line 54 to the first stage fractionating zone 11.

While it is contemplated that any of the alkali metals suitable for use in the process may be so employed, sodium and potassium appear to be most advantageous, and of these, potassium is preferred.

To cite typical operating conditions, the fractionating zone 11 may be operated at an absolute pressure between about 0.5 and 10.0 atmospheres and at a temperature within the range of about 375 to 725° C. A pressure reduction at the valve 15 upwardly of about one-fourth of the absolute upstream pressure ordinarily will be sufficient to permit dissociation of the hydride in exchanger 17. After passage through the exchanger 17, the temperature of the alkali metal stream may be raised within the range of about 5 to 50° C. in the heater 19. The fractionating zone 11 is operated at a high reflux ratio, e.g. 300 to 1, or greater. Under the stated conditions the contacting zone overhead in line 14 may contain between about ½ to 5 mol percent deuterium. In the second stage 32, the operating conditions may be within the above mentioned ranges, except that the fractionation in zone 35 may occur at a lower reflux ratio of about 100 to 1, or greater. The product gas taken from the system through line 48 may be made to contain deuterium in concentrations exceeding 95 mol percent and closely approaching purity.

The following specific example is given of operating conditions for the system. The feed stream in line 10 may consist of 35,000 mols per day of hydrogen together with 5 mols of deuterium, at a pressure of 28.5 p.s.i.g. and 430° C. temperature. Molten hydride is withdrawn from the fractionating column from line 13 at a temperature of 474° C. and a pressure of 28.5 p.s.i.g. and reduced at valve 15 to 24 p.s.i.g. in line 16. The exchanger effluent at about 467° C. in line 18 is heated at 19 about 20° before passage to the separator 21. Employing a reflux ratio in the fractionating zone 11 of 300 to 1, the contacting zone overhead in line 14 will contain about 2 mol percent deuterium. Reaction of the potassium in the contacting zone results in a net temperature increase to about 472° C.

About 238 mols per day of the deuterium-rich gas in line 14 is discharged to zone 35 at about 28.5 p.s.i.g. Molten hydride is withdrawn from the bottom of the zone at about 472°, reduced to about 1 atm. pressure, heat exchanged at 40 and taken to heater 42 at about 431° C. The hydride passes from the contacting zone 36 to a temperature of about 442° C. The product gas from line 48 contains 4.8 mols per day of deuterium, corresponding to a deuterium content of about 99 mol percent.

The invention contemplates the use of any suitable catalysts or activators to enhance formation of hydrides. Applying typically to potassium-hydrogen or sodium-hydrogen systems, and particularly the latter, we may activate the hydride formation by the use of such materials as anthracene, acetylene, kerosene or other compounds suitable for this purpose.

We claim:

1. The process for separating deuterium from a gaseous feed stream of mixed hydrogen and deuterium, that includes reacting said mixture under superatmospheric pressure in the range of about 0.5 to 10 atmospheres gauge with molten alkali metal to form alkali metal hydride preferentially retentive of hydrogen as compared with deuterium, separating a stream containing the alkali metal hydride from the deuterium-enriched gaseous residue, reducing the pressure of said stream to at least partially dissociate the hydride, heating the reduced pressure stream by heat resulting from the exothermic reaction of said gaseous mixture with the alkali metal, separating molten alkali metal from the reduced pressure stream so heated, and recirculating the separated alkali metal for reaction with said gaseous stream of hydrogen and deuterium.

2. The process according to claim 1, including the further step of heating said reduced pressure stream independently of heat resulting from said exothermic reaction.

3. The process according to claim 1, in which said gaseous feed stream contains between about 0.005 to 0.10 mol percent of deuterium and said deuterium-enriched gaseous residue contains between about 0.5 to 5 mol percent of deuterium.

4. The process according to claim 1, in which said gaseous mixture is reacted with the alkali metal at a temperature in the range of about 375 to 725° C.

5. The process according to claim 1 in which said alkali metal is potassium.

6. The process according to claim 1, in which said deuterium-enriched gaseous residue is further concentrated in deuterium by reacting said residue with molten alkali metal to form the hydride, separating and reducing the pressure of the hydride, heating the last mentioned hydride by heat resulting from the exothermic reaction of said residue with the alkali metal, separating molten alkali metal from the reduced pressure stream so heated and recirculating the separated alkali metal for reaction with said gaseous residue, and recovering a product deuterium-rich gaseous residue from the last mentioned reaction.

7. The process according to claim 6, in which the last mentioned separated and pressure-reduced hydride is heated independently of the heat of reaction of the alkali metal with said enriched gaseous residue.

8. The process according to claim 7, in which said product gaseous residue contains in excess of 95 mol percent deuterium.

9. The process for separating deuterium from a gaseous feed mixture of hydrogen and deuterium, that includes intimately contacting said gas under superatmospheric pressure in a fractionating zone with molten alkali metal hydride preferentially retentive of hydrogen as compared with deuterium, passing deuterium-enriched gas from said zone into a contacting zone and therein intimately contacting and reacting the gas with molten alkali metal fed to the contacting zone at a pressure in the range of about 0.5 to 10 atmospheres gauge, separately withdrawing from the fractionating zone a stream containing the alkali metal hydride, reducing the pressure of said stream to at least partially dissociate the hydride, passing the reduced pressure stream in indirect heat exchange with the molten alkali metal undergoing reactions in said contacting zone, then flowing said stream through a separating zone and passing molten alkali metal therefrom to said contacting zone for reaction with said gas from the fractionating zone, passing the resulting hydride to the fractionating zone, and withdrawing further deuterium-enriched gas from said contacting zone.

10. The process according to claim 1 in which said reduced pressure stream is heated additionally to heat transferred thereto in said contacting zone.

11. The process according to claim 10, in which said gaseous feed stream contains between about 0.005 to 0.10 mol percent of deuterium and said deuterium-enriched gas withdrawn from the contacting zone contains between about 0.5 to 5 mol percent deuterium.

12. The process according to claim 10, in which said fractionating zone is maintained at a temperature between about 375 to 725° C.

13. The process of claim 10 supplemented by processing the deuterium-enriched gas from the contacting zone in the manner that the feed gas is processed according to claim 10, to produce a product deuterium-rich gas.

14. The process of claim 11 supplemented by processing the deuterium-enriched gas from the contacting zone 13 the feed gas is processed according to claim 11, to produce a product deuterium-rich gas.

15. The process of claim 12 supplemented by processing the deuterium-enriched gas from the contacting zone 13 the feed gas is processed according to claim 12, to produce a product deuterium-rich gas.

References Cited in the file of this patent
UNITED STATES PATENTS

| | | |
|---|---|---|
| 1,855,355 | Kloepfer | Apr. 26, 1932 |
| 2,780,526 | Fleck | Feb. 5, 1957 |

OTHER REFERENCES

"Chemistry of Hydrides," by Dallas T. Hurd (1952), page 210.

"Inorganic Chemistry," by Therald Moeller (1952), page 390.

"Cryogenic Engineering," by Russell Scott (1959).